United States Patent
Keidar et al.

(10) Patent No.: US 11,077,962 B2
(45) Date of Patent: Aug. 3, 2021

(54) HIGH THRUST TO POWER MICRO CATHODE ARC THRUSTER

(71) Applicant: The George Washington University, Washington, DC (US)

(72) Inventors: Michael Keidar, Baltimore, MD (US); George Lewis Teel, Arlington, VA (US); Joseph Nicholas Lukas, Washington, DC (US); Jonathan Kolbeck, Washington, DC (US)

(73) Assignee: The George Washington University, Washington, DC (US)

( * ) Notice: Subject to any disclaimer, the term of this patent is extended or adjusted under 35 U.S.C. 154(b) by 431 days.

(21) Appl. No.: 15/773,732

(22) PCT Filed: Dec. 6, 2016

(86) PCT No.: PCT/US2016/065168
§ 371 (c)(1),
(2) Date: May 4, 2018

(87) PCT Pub. No.: WO2017/146797
PCT Pub. Date: Aug. 31, 2017

(65) Prior Publication Data
US 2018/0370659 A1 Dec. 27, 2018

Related U.S. Application Data

(60) Provisional application No. 62/264,074, filed on Dec. 7, 2015.

(51) Int. Cl.
*B64G 1/40* (2006.01)
*F03H 1/00* (2006.01)
*H05H 1/50* (2006.01)

(52) U.S. Cl.
CPC .......... *B64G 1/405* (2013.01); *F03H 1/0012* (2013.01); *F03H 1/0018* (2013.01); *F03H 1/0087* (2013.01); *H05H 1/50* (2013.01)

(58) Field of Classification Search
CPC .... F03H 1/0012; F03H 1/0087; F03H 1/0093; B64G 1/406
See application file for complete search history.

(56) References Cited

U.S. PATENT DOCUMENTS 6,711,202 B2   3/2004   Morton
7,530,219 B1   5/2009   Burton
(Continued)

FOREIGN PATENT DOCUMENTS

WO   WO2014/127325   *   8/2014   ............... B64G 1/40
WO   WO 2014/127325 A1   8/2014

OTHER PUBLICATIONS

Schein "Vacuum Arc Thruster for CubeSat Propulsion" (Year: 2003).*
(Continued)

*Primary Examiner* — Gerald L Sung
*Assistant Examiner* — William L Breazeal
(74) *Attorney, Agent, or Firm* — Nixon Peabody LLP

(57) ABSTRACT

A thruster for a micro-satellite is disclosed. The thruster includes a cathode composed of a propellant material and an anode composed of ablative material. The thruster includes a housing having a proximate end and an opposite distal end having a thrust channel. The housing holds the anode and the cathode. A pulsed voltage source is coupled between the cathode and the anode causing current sufficient to create ablation of the anode and a plasma jet including ablated particles from the anode to be emitted from the thrust channel.

14 Claims, 3 Drawing Sheets

(56) References Cited

U.S. PATENT DOCUMENTS

| | | | |
|---|---|---|---|
| 8,875,485 B2 | 11/2014 | Keidar | |
| 2011/0258981 A1* | 10/2011 | Keidar | F03H 1/0087 |
| | | | 60/202 |
| 2013/0067883 A1 | 3/2013 | Elwing | |

OTHER PUBLICATIONS

Keidar, M.; "Micro-Cathode Arc Thruster for Small Satellite Propulsion"; George Washington Univ., Jun. 30, 2016 (8 pages).
Lukas, J et al.; "Toward a High Thrust-to-Power Ratio in the Micro-Cathode Arc Thruster"; Nov. 24, 2015 (8 pages).
International Search Report for Application No. PCT/US2016/065168, dated Aug. 7, 2017 (2 pages).
Written Opinion of International Searching Authority for Application No. PCT/US2016/065168, dated Aug. 7, 2017 (5 pages).

* cited by examiner

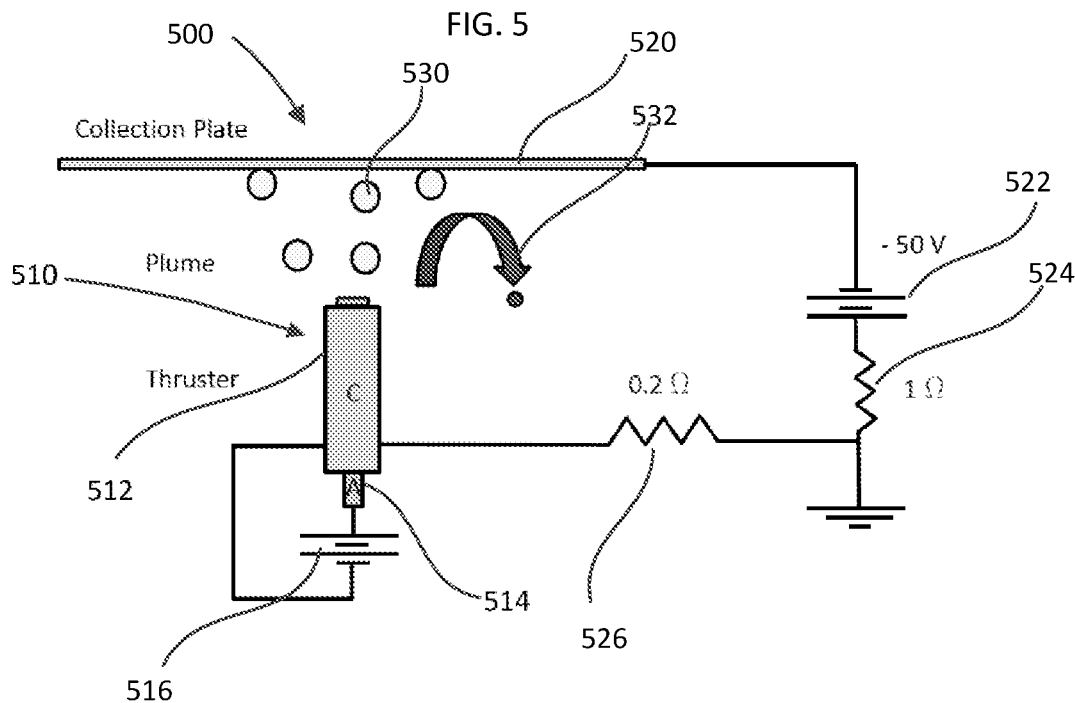
FIG. 5
FIG. 6
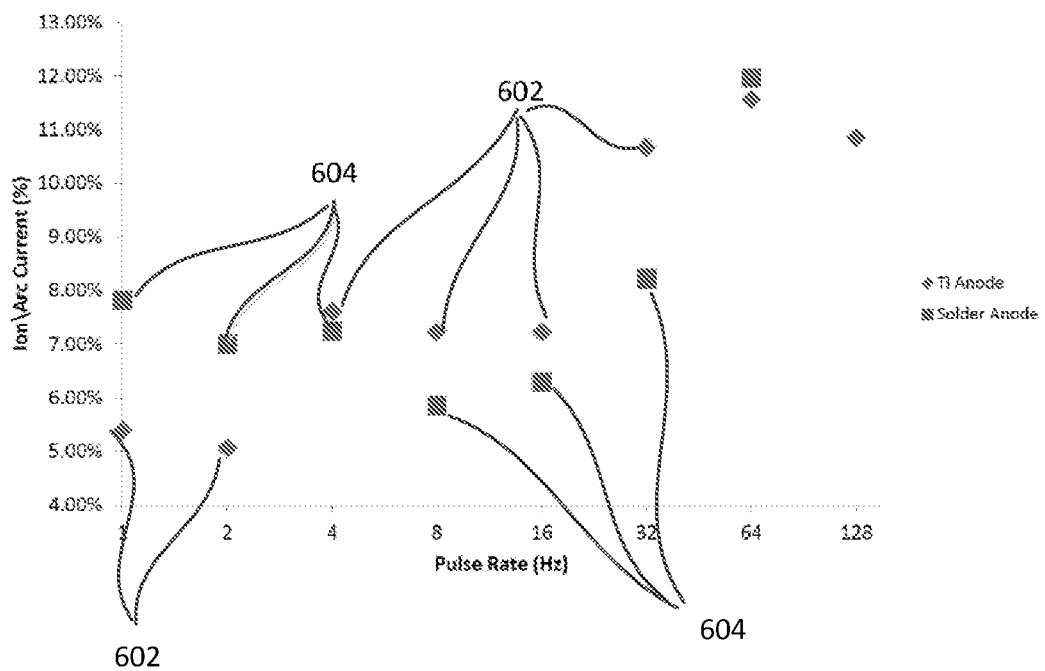

HIGH THRUST TO POWER MICRO CATHODE ARC THRUSTER

PRIORITY

The present application claims priority to PCT/US2016/065168 filed on Dec. 6, 2016, which claims priority to U.S. Provisional Application No. 62/264,074, filed on Dec. 7, 2015, all of these applications are hereby incorporated by reference in their entireties.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to space propulsion systems and, more particularly, to using an ablative anode in a micro cathode arc thruster.

BACKGROUND

Development of micro-spacecraft such as micro- and nano-satellites has expanded significantly in the last ten years with the increased miniaturization of components. The satellite user community is moving towards constellations of reprogrammable/reconfigurable autonomous systems that require numerous micro- or nano-satellites. Such satellites require a propulsion system that is sufficiently small but provides sufficient power to position the satellites in such constellations.

The design of such micro-spacecraft therefore affects the requirements of the propulsion system due to limitations related to power, mass, and fuel system complexity. The advanced propulsion systems are necessary for station keeping and orbit transfer to extend the life of the satellite, thus minimizing program launch costs and maximizing satellite lifetime value. New types of micro- and nano-thrusters are therefore needed that offer a wide range of impulse bits from nN-s to µN-s, with overall thrust efficiencies of 10-20% and very low (≤1 kg) total thruster and power processing unit (PPU) mass.

A vacuum arc thruster (VAT) plasma source propulsion unit is one alternative propulsion system for micro-satellites. Such a plasma drive incorporates a cathode and anode separated by an insulator. The plasma drive includes a voltage source connected to an inductor and provides current to the inductor when a switch is enabled. The current in the inductor increases until the switch opens, which causes an arc initiation potential and an arc develops between the cathode and the anode. The plasma drive produces plasma about the external cathode-insulator interface, which is directed distally by the magnetic field. The cathode serves as the solid fuel source and propellant for the vacuum arc thruster. The thrust created by the vacuum arc thruster is dominated by pressure gradients formed by expanding plasma generated by a low voltage energy source. The efficiency and life of a vacuum arc thruster may be enhanced by a magnetic field used to direct the thrust produced. Such a vacuum arc thruster is disclosed in U.S. Patent Publication No. 2011/0258981 hereby incorporated by reference.

One known thruster is a micro cathode anode thruster (µCAT). This thruster is an electric propulsion device, based on the well-researched vacuum arc process, enhanced by an external magnetic field that uses its own thruster cathode as propellant. The cathode terminal can be any conductive material. The applied magnetic field extends operation lifetime while reliance on a thruster element for propellant reduces system mass for micropropulsion compatible with 1-50 Kg class satellites, including all CubeSat forms. Low voltage (~18V through the power management section) is needed to energize the system, and the instantaneous peak arc discharge 50 A, and a sustained arc voltage of ~30-40 V DC produces quasi-neutral plasma. Nickel and titanium cathodes have been characterized with specific impulse of 2200 s and 2800 s. Actuation energy is 0.1 W/Hz for 2 micro-N-s impulse-bit, and a preliminary assessment utilizing an array of six nickel cathode thruster channels, each operating at 50 Hz, producing 600 N of thrust, show approximately 30 W power input is required, for a total ΔV capability of about 3540 m/s.

However, existing thruster designs such as the µCAT has a thrust to power ratio of about 20 µN/W with efficiency up to 15% of the applied power. One of the major inefficiencies of this system is associated with the fact that only about 10% of discharge current is the ion current, which contributes to the thrust. 90% of the discharge current is conducted by electrons contributing to the anode heating but diverted from contributing to thrust.

Thus, there is a need for a propulsion system that may provide more efficient use of power for thrust output. There is a further need for a propulsion system that can decrease anode heating due to discharge current conducted by electrons to increase efficiency in thrust. There is also a need to keep the propulsion system design as compact as possible for micro- or nano-satellites.

SUMMARY

According to one example, a thruster for a micro-satellite is disclosed. The thruster includes a cathode composed of a propellant material and an anode composed of ablative material. A housing has a proximate end and an opposite distal end having a thrust channel. The housing holds the anode and the cathode. A pulsed voltage source is coupled between the cathode and the anode causing current sufficient to create ablation of the anode and causing a plasma jet including ablated particles from the anode to be emitted from the thrust channel.

Another example is a method of providing propulsion. An anode of ablative material is selected. A cathode of propellant material is selected. A current is provided between the cathode and the anode. The current is sufficient to ablate the material of the anode. The anode is ablated via an electron flow between the cathode and the anode generated by a plasma spot created by the current on the cathode. A plasma jet including the ablated anode material from an arc between the cathode and the anode is created in a thrust channel.

Another example is a micro-satellite including a payload and a thruster having a cathode and an anode of ablative material. A power unit is coupled to the thruster. The power unit includes an inductor and a switching device coupled to the thruster. A controller is coupled to the switching device to cause an electrical pulse from the power unit to be applied to the cathode and anode to generate an arc between the anode and cathode to ablate the anode and generate a plasma jet.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 5 is a circuit diagram of a measurement system to measure the thrust generated from the thruster unit in FIG. 2; and FIG. 6 is a graph of comparable thrust and power for an ablative anode and a non-ablative anode.

Figure 1A:
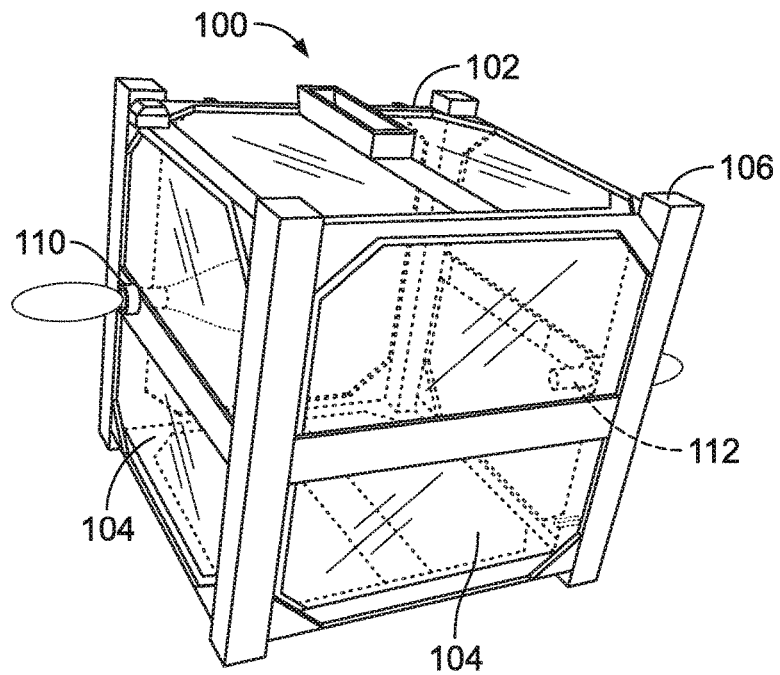
FIG. 1 is a perspective view of a cube micro-satellite incorporating high thrust to power ratio micro-cathode anode thruster units.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a perspective view of an example cube micro-satellite 100. The cube micro-satellite 100 includes a cubic shaped body 102 that provides an enclosure to hold a payload. Such a satellite may be used in constellations of satellites which perform different functions based on components which may be the payload. The body 102 includes side panels 104 that are attached to a framework 106. The side panels 104 may include solar cells to provide power for the satellite 100. The body 102 may hold a payload including components such as an altitude control system, camera system, transmission system, and antenna system (not shown) or other components. The micro-satellite 100 is maneuvered by two example micro-cathode anode thrusters 110 and 112 that are mounted on the framework 106. Each of the thrusters 110 and 112 incorporates an anode of ablative material to assist in producing efficient thrust via a plasma jet generated by an electrical arc between the cathode and the anode.

Figure 2:
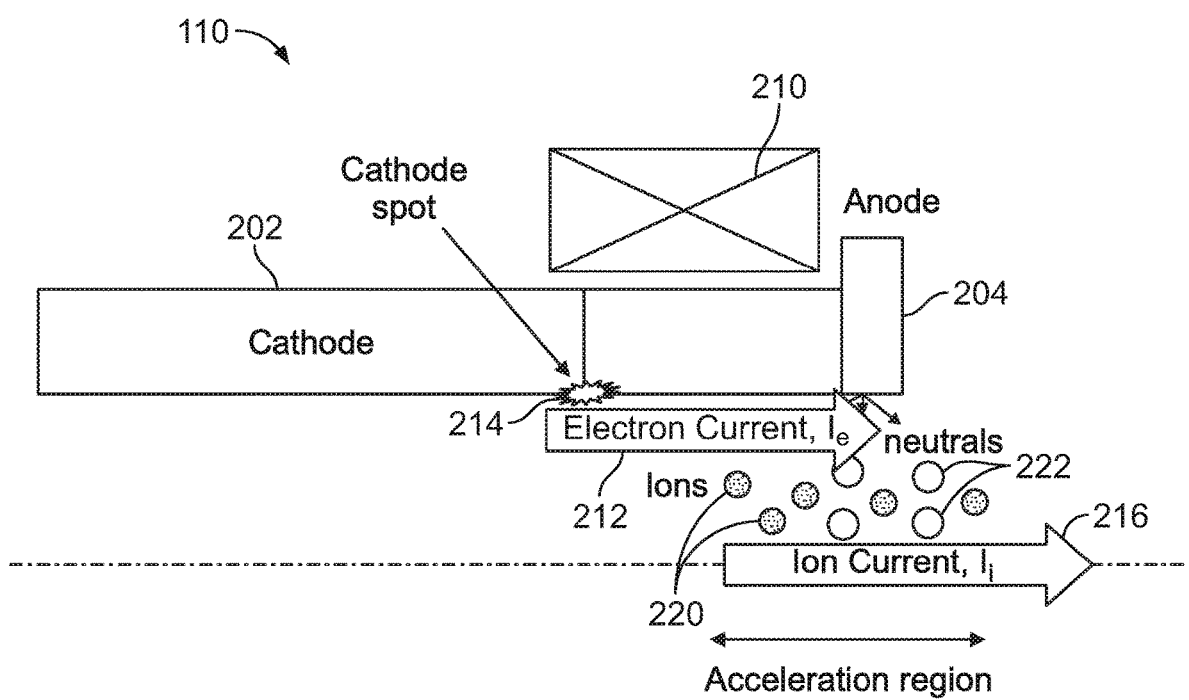
FIG. 2 is a circuit diagram of the one of the micro-cathode anode thrusters having an ablative anode with high thrust to power ratio in the satellite shown in FIG. 1.

FIG. 2 is a circuit diagram of the thruster 110 in FIG. 1. The thruster 110 includes a cathode 202 and an anode unit 204. A magnetic field source such as a magnet 210 creates an applied magnetic field to direct the generated plasma jet created by the anode unit 204 and cathode 202. An electrical circuit is created by attaching a power source between the cathode 202 and the anode unit 204. The output of the power source is pulsed to the cathode 202 and anode unit 204 creating an electron current.

The applied electrical current from the pulse creates an electric arc between the anode unit 204 and the cathode 202. The arc forms a localized region of high temperature plasma or "cathode spot" 214 on the cathode 202. The cathode spot 214 is a small area on the surface of the cathode 202. The electric arc creates a high velocity plasma jet providing efficient, low-thrust. Each charge-discharge pulse of the electric arc initiated by a power control to creates a plasma exhaust or "impulse bit." Thrust levels may be controlled by increasing or decreasing the number of pulses each second. Thus, the cathode 202 is a conductor material that is a propellant for the thruster 110. The anode unit 204 is also a conductive material that serves as additional propellant for the thruster 110.

Specifically, the electron current is created as represented by an arrow 212 by the cathode spot 214 on the cathode 202. The electron current 212 includes ions 220 generated from the electrical current through the cathode 202. Neutral atoms 222 are created by the current running through the anode unit 204 and ablating the anode material. As will be explained below, the anode unit 204 is made of an ablative material such as tin solder that ablates when sufficient current primarily carried by electrons is applied. The neutral atoms 222 are carried into the acceleration area between the cathode spot 214 and the anode unit 204. An arrow 216 represents an ion current created by the application of current between the anode unit 204 and the cathode 202. The ions 220 and neutral atoms 222 in the ion current are accelerated between the cathode 202 and the anode unit 204. The ablation of the anode unit 204 leads to increased thrust to power ratio of the thruster 110.

Figure 3:
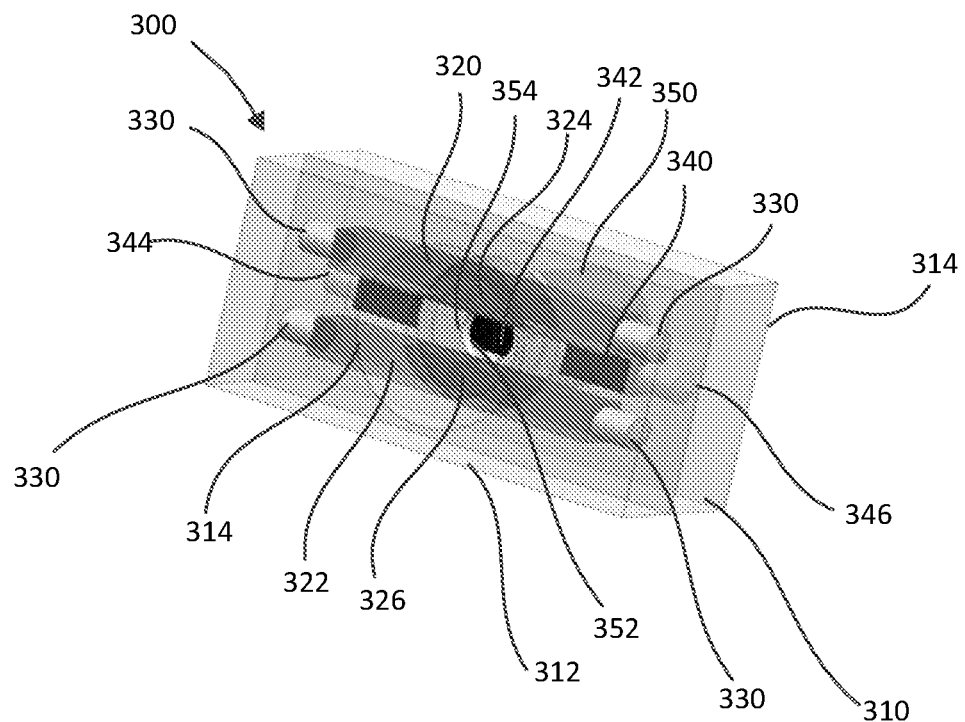
FIG. 3 is a close up perspective view of the micro-cathode anode thruster with high thrust to power ratio shown in FIG. 2.

FIG. 3 is a perspective view of one example of the physical components of a micro-cathode anode thruster unit 300 such as the thruster 110 or 112 in FIGS. 1 and 2. The micro-cathode anode thruster 300 includes a rectangular housing 310 having a top half 312 and a bottom half 314. The top half 312 includes a circular aperture 316 for emission of the plasma jet produced by the thruster unit 300. Thus, the top half 312 is a distal end with the circular aperture 316 serving as a thrust channel and the bottom half 314 is a proximate end.

A pair of anodes 320 and 322 are mounted laterally across the top half 312 of the housing 310. The anodes 320 and 322 form the anode unit 204 in FIG. 2. The anodes 320 and 322 are generally rectangular in shape in this example, but they may be formed in different shapes. Of course any number of separate anodes may be used. The anodes 320 and 322 include areas 324 and 326 respectively that are exposed via the aperture 316. Each end of the anodes 320 and 322 are in contact with biasing members such as springs 330 that are placed between the ends of the anodes 320 and 322 and the sides of the interior of the top half 312 of the housing 310. The springs 330 insure the anode 320 and 322 are held in place as the anode material is ablated from the anodes 320 and 322 during operation of the thruster unit 300.

A cathode 340 is mounted laterally in the bottom half 314 of the thruster unit 300. The cathode 340 is generally rectangular in shape in this example, but it may be formed in different shapes. In this example a single cathode is used, but it is to be understood that multiple numbers of cathodes may be used. The cathode 340 includes an area 342 that is exposed to the aperture 316 through another aperture 352 formed in the bottom half 314. In this example, the cathode 340 is fabricated from a conductive material such as titanium but other materials such as nickel, carbon, aluminum, chromium, iron, yttrium, molybdenum, tantalum, tungsten, lead, or bismuth may be used. A power source is coupled between the cathode 340 and the anodes 320 and 322 and thus the cathode spot is formed on the exposed area 342 to create the plasma jet toward the anodes 320 and 322. In this example, the anodes 320 and 322 are fabricated from an ablative conductive material such as Sn63/Pb37 solder. Of course other ablative materials with relatively lower melting temperatures in relation to the melting point of the cathode material and magnitude of the current density for the anode such as copper, nickel, manganese, or beryllium may be used. For example, if the anodes 320 and 322 are fabricated from copper, the cathode 340 may be fabricated from titanium, nickel or tungsten and a current of 30-100 A will be applied for anode ablation.

A pair of biasing members such as springs 344 and 346 are mounted between the interior walls of the bottom half 314 of the housing 310 and the respective ends of the cathode 340. As material in the cathode 340 is consumed by the operation of the thruster 300, the springs 344 and 346 insure that the cathode 340 is held in place.

The biasing members that contact the anodes 320 and 322 and cathode 340 may be any biasing device sufficient to provide a force to keep the respective anodes 320 and 322 and cathode 340 in position relative to each other and the housing 310. For example, the biasing members may be a compression spring, a constant force spring, a torsional spring, and the like. Alternatively, the biasing members may be an electromechanical actuator or the like for pushing or pulling or otherwise urging the anodes 320 and 322 and the cathode 340 in position.

The bottom half 314 also includes a cylindrical magnet unit 350 that is used to generate the magnetic field to guide the plasma jet. The magnet unit 350 in this example is a solenoid that produces a magnetic field that steers the arc spot on the cathode 340 in such a way to produce a uniform erosion of the cathode 340. In this example, the housing 310 is formed of a ceramic insulator such as Teflon.

The aperture 352 is formed from a circular interior surface 354 formed between the anodes 320 and 322 and the cathode 340 that has a conductive coating to facilitate the arc between the anodes 320 and 322 and the cathode 340.

Figure 4:
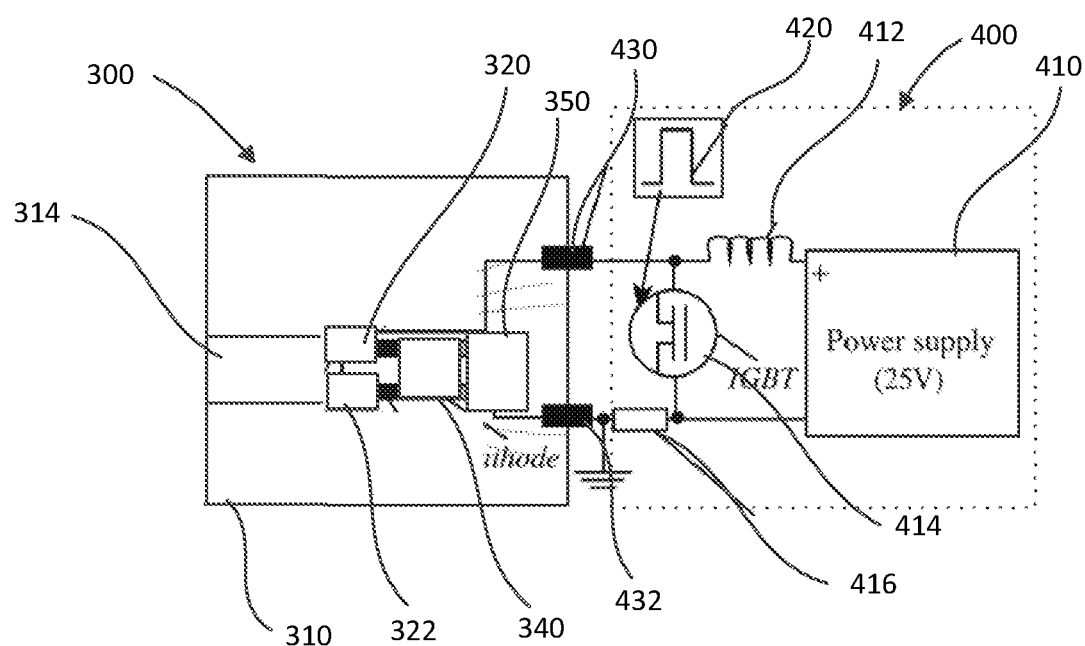
FIG. 4 is a circuit diagram of an example thruster according to the principles in FIG. 3.

FIG. 4 is a circuit diagram of a power and control unit 400 used with the micro-cathode anode thruster 300 in FIG. 3. Like elements in FIG. 3 are labeled with like numbers in FIG. 4. The power and control unit 400 includes a voltage source 410, which is a battery in this example. The voltage source 410 may be recharged from solar panels on the exterior of the micro-satellite 100 in FIG. 1. The power and control unit 400 includes an energy storage inductor 412, which is coupled to the voltage source 410. The energy storage inductor 412 is coupled to a switching device 414, which is coupled in series to one of a resistor 416 that is also coupled to the voltage source 410. The other end of the resistor 416 is coupled to ground. The thruster unit 300 is coupled in parallel to the switching device 414 and the resistor 416.

The switching device 414 is controlled by a controller 420, which has a pulse output 422 coupled to the switching device 414. The controller 420 in this example is any logic device that has sufficient computational capability to generate variable pulse and control signals. The controller 420 may include processing capabilities to offer different levels of thrust. A first connector 430 in the housing 310 allows connection of one terminal of the switching device 414 to the anodes 320 and 322. A second connector 432 allows connection of the other terminal of the switching device 414 to the cathode 340. Thus, opening the switch 414 closes the circuit between the inductor 412 through the anodes 320 and 322 and the cathode 340.

The voltage source 410 may be a battery, a solar photovoltaic cell or cells, or the like. The voltage source 410 provides current to the energy storage inductor 412 when the switching device 414 is enabled via a control signal from the controller 420. The current in the inductor 412 increases until the switching device 414 opens. Upon the switching device 414 opening, the output voltage in the thruster unit 300 increases until it achieves an arc initiation potential and an arc develops in the thruster unit 300 between the cathode 340 and the anodes 320 and 322.

The circuit in FIG. 4 is an inductive energy storage system that is a pulsed voltage source coupled between the anodes 320 and 322 and the cathode 340. A trigger pulse is applied by the controller 420 to cause the switching device 414 to close. This accumulates energy in the inductor 412 from the voltage source 410. When the inductor coil 412 is fully charged, the switching device 414 is opened at a very fast speed (several microseconds) via the signal from the controller 420, and a surge voltage, L*dI/dt, is produced between the terminals of the inductor 412. This leads to a breakdown and initiation of arc discharge between the cathode 340 and the anodes 320 and 322. The surge voltage breaks down the thin conductive coating at the interior surface 354 at relatively low voltage levels (≈200 V).

Typically, the whole discharging process takes around several hundred microseconds and the current is around 60 A (for 100 to 500 µs) and conducted with voltages of 25-50 V. The current is sufficient to create ablation of the anodes 320 and 322 thus serving as additional propellant for the thruster 300. The efficiency of the thruster 300 may thus be ≥90%. Consequently, most of the magnetic energy stored in the inductor 412 is deposited into the plasma pulse. By varying the length of a trigger signal by the controller 420, the level of the current in the switching device 414, and thereby the energy stored in the inductor 412, may also be adjusted. This in turn changes the amount of energy transferred to the arc and the impulse bit of the individual pulse. The repetition rate of the individual pulse can be changed by varying the input signal as well.

The energy storage inductor 412 may be an iron or ferrite core inductor, an air core inductor, or a magnetic inductor or any other suitable inductor. In this example, the switching device 414 is a semiconductor insulated-gate bipolar transistor (IGBT). The switching device 414 may also be any appropriate switching device such as a MOSFET.

The conductive thin film coating layer on the interior surface 354 enables discharge initiation at low applied voltages of about several hundred volts. The conductive thin film coating layer may be a metal or carbon in this example. The conductive thin film coating layer is preferably less than 1 micron thick and more preferably about 0.1 micron to about 1 micron thick, so that the resistance of the conductive thin coating layer between the anodes 320 and 322 and the cathode 340 is about 1 to about 40 kΩ. The high electric field produced between the anodes 320 and 322 and the cathode 340 causes breakdown of the conductive thin film coating layer on the interior surface 354. This breakdown causes porosity or small gaps along the insulator material in the conducting area of the interior surface 354 such that microplasmas are generated. In this example, these micro-plasmas expand into the surrounding space and allow current to flow directly from the cathode 340 to the anodes 320 and 322 by forming a low resistance plasma discharge path about 0.01 ohm to about 0.1 ohm lower than an initial conductive thin film surface discharge path.

The magnetic field is produced through the magnetic unit 350. The magnetic unit 350 provides a specific distribution magnetic field. In this example, a magnetic core interacts with a coil to produce the magnetic field in the magnetic unit 350. In this example, the coil is designed to use 0.5 mm diameter copper wire wound up to 700 turns (the length and outer diameter are about 15 and 45 mm respectively). The magnetic core in this example is manufactured from steel 1020 and has the shape of a washer.

The thruster shown in FIGS. 2-4 has increased efficiency due to the material of anode. Power associated with electron flux from the current between the anode and the cathode goes into anode heating. By utilizing the ablative anode material in the anode unit 204 in FIG. 2 or modifying the anode geometry so that anode ablation becomes significant, a twofold result occurs. The anode temperature is decreased due to ablative cooling. Further, the anode material that is ablated will be ejected from the anode unit 204 thus increasing the flow rate. The flow rate directly contributes to thrust increase if flow velocity can be maintained. The ablated anode material is injected into the acceleration region. As such ion-neutral collisions between the ions 220 and the neutral atoms 222 will lead to neutral acceleration and an increase in thrust.

The thrust to power ratio in the micro-cathode anode arc thruster 200 may be calculated as:

$$\frac{T}{P} = \frac{\dot{m}V_t}{I_d U_d} = \frac{fm_i V_i}{eU_d} \quad (1)$$

where T is thrust, P is power, f is the ion current fraction (typically 0.08-0.1), $m_i$ is the ion mass, $V_i$ is ion velocity, and $U_d$ is discharge voltage. In the case of significant anode ablation the thrust to power ratio may be estimated as:

$$\frac{T}{P} = \frac{fm_i V_i}{eU_d} + \frac{ALvm_a V_i}{I_D U_d} = \frac{fm_i V_i}{eU_d}\left(1 + \frac{m_a Lv}{m_i V_i}\right) \quad (2)$$

In this case, additional thrust is generated due to the neutral atoms injected as a result of anode ablation. The increase in thrust to power ratio due to anode ablation may be estimated as:

$$(1+\alpha\sigma nL) \quad (3)$$

where α is ratio of mass flux from anode to that of the cathode, a is the cross section (~$10^{19}$ m$^{-2}$), n is the ion density ($10^{21}$ m$^{-3}$), L is the length of acceleration region (0.01 m). If α~1-2, the thrust to power ratio may be increased by a factor of 2-3.

Since under these conditions the ion acceleration and the momentum-transfer collisions from ions to neutral atoms occur in the same region simultaneously, momentum is not only transferred to the neutral-gas but also the total momentum delivered by the electric force to the ion-neutral flow is greatly increased. According to some estimations the thrust may be enhanced by $$\sqrt{L/\lambda} \quad (4)$$

where L is the acceleration region length (about 1 cm) and λ is the mean free path for ion-neutral collisions (about 1 mm). Thus thrust to power is expected to increase by factor of 3. In addition, the electron trap in a magnetic field will lead to neutral ionization and thus increase overall ionization degree in the flow.

FIG. 5 is a circuit diagram of an experimental test system 500 to test a thruster 510 having a cathode 512 and an anode 514 having ablative material. The thruster 510 includes a power source 516 that creates a current between the cathode 512 and the anode 514 to create a plasma stream.

The test system 500 includes a collector plate 520 that is coupled to a power source 522. The power source 522 is connected to ground via a resistor 524. A second resistor 526 is coupled between the cathode 512 and ground. As will be explained the resistors 524 and 526 allow the measurement of discharge current.

The test system 500 is used to verify the increase in thrust efficiency from use of the anode 514 having ablative material. A preliminary set of experiments were setup to verify that the inclusion of an ablating anode could enhance thruster efficiency and thrust levels. The first experiment consisted of comparing ion-to-arc current from a titanium anode to that of an anode composed of Sn63/Pb37 solder at various frequencies used for the anode 514. The second experiment included two 17 hour lifetime test of the thruster 510, one with a 18-8 stainless steel anode and one with the Sn63/Pb37 solder anode, where the anode mass loss was measured.

During the lifetime test, the copper plate collector 520 was placed in front of the thruster 510 during testing and was analyzed afterwards under a Scanning Electron Microscope (SEM) to determine if any particles of anode material were present.

To measure ion current, the collector plate 520 was biased to negative 82 Volts and placed in proximity to the thruster 510. The thruster 510 and the plate 520 were placed in a vacuum chamber. The vacuum chamber was brought to a pressure of $10^{-5}$ Torr. As the thruster 510 expelled plasma, ions were collected on the plate 520 and a Tektronix 2004B oscilloscope recorded both the arc discharge voltage from the thruster 510 and the collected ion voltage from the copper plate 520.

To calculate the arc discharge current and the ion current, respective probes were placed over the resistor 524 (1 Ohm) and the resistor 526 (0.2 Ohm) and Ohm's Law was used. The oscilloscope had an acquisition mode that collected several waveforms, in increments of 4, 16, 64 or 128, and displayed the average of the waveforms. This technique allowed for the elimination of uncorrelated noise in the signal and is quicker than collecting single waveforms separately and later averaging them together. This technique was used to collect the average of 128 waveforms for thruster pulse rates of 1, 2, 4, 8, 16, 32, 64 and 128 Hz. Ions 530 were collected on the plate 520 while electrons 532 were deflected away.

The results of ion collection experiment for various frequencies are shown in FIG. 6. A series of squares 602 represent the plots of the ablative anode while a series of diamonds 604 represent the plots of the non-ablative anode. It can be seen that using an ablative anode, the ion-to-arc current for the solder anode proved to be 45% and 38% higher than the titanium anode at 1 Hz and 2 Hz, respectively. As the pulse frequency increases, the ion-to-arc current for the titanium anode gets closer to the solder and eventually surpasses it. It is speculated that this observation is due to the creation of macro-particles in the solder anode. Macro-particles are mass droplets that break off consuming a large portion of propellant, contributing very little to thrust and lower the overall thruster efficiency.

Before the lifetime testing of the thruster 510 began, five mass measurements of each type of anode were taken and averaged using a Sartorius CPA225D Semi-Micro balance. Testing ran for 17 hours for each type of anode at a pulse rate of 10 Hz. The vacuum chamber was brought to a pressure of $10^{-5}$ Torr. After each lifetime run, the anode was again measured five times and the final average mass was recorded.

During the 17 hour μCAT lifetime test, a piece of copper foil was placed 19.4 mm away from the head of the thruster 510 to collect any plasma particles. Standard particles that were expected on the copper foil include: copper (from the foil itself), titanium (from the cathode), and carbon (from the carbon paint used between the anode and cathode). However, with the theorized anode ablation, it is also expected that solder particles, both tin and lead, should be present as well. If the 18-8 stainless steel anode were to ablate, chromium, nickel, and iron particles should also be present.

The solder anode lost 0.029566 grams, while the stainless steel anode actually gained mass. The mass loss and gain may be explained when the anodes were examined under the SEM. When viewed with the SEM, the untouched solder anode appears smooth, while the solder anode after firing has abrasions and divots. The mass gain for the stainless steel anode was coated with carbon, as well as titanium, which appears to have added to its final mass. When analyzing the copper collector the stainless steel anode showed only the expected elements of copper, titanium, and carbon, showing that there was no anode ablation. The solder anode copper collector showed the expected elements (carbon, copper, titanium, tin, and lead), in addition to tin and lead. This shows that the solder that was ablating was being expelled from the thruster 510 and converted into thrust.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A thruster for a micro-satellite, the thruster comprising:
a cathode composed of a propellant material;
a first anode composed of an ablative material;
a second anode composed of the ablative material
a housing having a proximate end and an opposite distal end having a thrust channel having an emission end, the housing holding the first anode, the second anode and the cathode mounted between interior surfaces in the housing, wherein the first anode and the second anode are proximate to the emission end of the thrust channel and the first anode and the second anode are located between the cathode and the emission end;
a first pair of biasing members in contact between the interior surfaces of the housing and the cathode;
a second pair of biasing members in contact between the interior surfaces of the housing and the first anode and the second anode; and
a pulsed voltage source coupled between the cathode, and the first anode and the second anode causing current sufficient to create ablation of the first anode and the second anode and causing a plasma jet including ablated particles from the first anode and the second anode to be emitted from the emission end of the thrust channel.

2. The thruster of claim 1, wherein the ablative material is a solder.

3. The thruster of claim 1, wherein the cathode comprises one of titanium, nickel or steel.

4. The thruster of claim 1, wherein the first pair of biasing members and the second pair of biasing members are springs.

5. The thruster of claim 1, further comprising a magnet on the proximate end of the housing, the magnet emitting a magnetic field to direct the plasma jet.

6. A method of providing propulsion comprising:
selecting a first anode and second anode, the first anode and the second anode each comprising an ablative material;
selecting a cathode comprising a propellant material;
mounting the cathode between the first anode and the second anode and between internal surfaces of a housing having a proximate end and an opposite distal end having a thrust channel having an emission end, the housing further including a first pair of biasing members in contact between the interior surfaces of the housing and the cathode; and a second pair of biasing members in contact between the interior surfaces of the housing and the first anode and the second anode;
providing a current between the cathode and the first anode and the second anode, wherein the current is sufficient to ablate the ablative material of the first anode and the second anode;
ablating the first anode and the second anode via an electron flow between the cathode and the first anode and the second anode generated by a plasma spot created by the current on the cathode; and
creating a plasma jet including ablated ablative material from an arc between the cathode and the first anode and the second anode in the thrust channel, wherein the first anode and the second anode are proximate to the emission end of the thrust channel and the first anode and the second anode are located between the cathode and the emission end.

7. The method of claim 6, wherein the ablative material is solder.

8. The method of claim 6, wherein the cathode comprises one of titanium, nickel or steel.

9. The method claim 6, further comprising generating a magnetic field to direct the plasma jet.

10. A micro-satellite comprising:
   a payload;
   a thruster including a thrust channel, a housing, a cathode, a first pair of biasing members, a second pair of biasing members, a first anode comprising an ablative material and a second anode comprising the ablative material, wherein the housing holds the first anode, the second anode, and the cathode mounted between interior surfaces in the housing, wherein the thrust channel has an emission end, wherein the first pair of biasing members are in contact between the interior surfaces and the cathode, wherein the second pair of biasing members are in contact between the interior surfaces and the first anode and the second anode, and wherein the first anode and the second anode are proximate to the emission end of the thrust channel and the first anode and the second anode are located between the cathode and the emission end;
   a power unit coupled to the thruster, the power unit including an inductor and a switching device coupled to the thruster; and
   a controller coupled to the switching device, the controller causing an electrical pulse from the power unit to be applied to the cathode and the first anode and the second anode to generate an arc between the first anode and the second anode and the cathode to ablate the first anode and the second anode and generate a plasma jet.

11. The micro-satellite of claim 10, wherein the ablative material is solder.

12. The micro-satellite of claim 10, wherein the cathode comprises one of titanium, nickel or steel.

13. The micro-satellite of claim 10, wherein the first pair of biasing members and the second pair of biasing members are springs.

14. The micro-satellite of claim 10, wherein the thruster includes a magnet emitting a magnetic field to direct the plasma jet.

* * * * *